United States Patent
Kato et al.

[11] Patent Number: 6,068,938
[45] Date of Patent: May 30, 2000

[54] MAGNESIUM BASED ALLOYS ARTICLE AND A METHOD THEREOF

[75] Inventors: Jun Kato; Wataru Urushihara; Takenori Nakayama, all of Kobe, Japan

[73] Assignee: Kabushiki Kaisha Kobe Seiko Sho, Kobe, Japan

[21] Appl. No.: 09/059,262

[22] Filed: Apr. 14, 1998

[30] Foreign Application Priority Data

Apr. 15, 1997 [JP] Japan ............................... 9-097593

[51] Int. Cl.$^7$ ............................. C25D 5/42; B32B 15/00
[52] U.S. Cl. .......................... 428/649; 205/291; 205/305; 427/305; 428/655; 428/656; 428/657; 428/658; 428/668; 428/671; 428/675; 428/924; 428/457
[58] Field of Search ............................. 428/649, 655, 428/656, 657, 658, 668, 671, 675, 924, 457; 427/305; 205/291, 305

[56] References Cited

U.S. PATENT DOCUMENTS 3,099,083  7/1963  De Long ................................. 428/649
3,631,835  1/1972  Hamontre et al. ..................... 428/649

*Primary Examiner*—Deborah Jones
*Assistant Examiner*—Robert R. Koehler
*Attorney, Agent, or Firm*—Oblon, Spivak, McClelland, Maier & Neustadt, P.C.

[57] ABSTRACT

An Mg based article excellent in plating adhesion which is produced with an Mg alloy base material regardless of its kind by forming a Zn layer of an average thickness of 0.60 $\mu$m or more, or a Zn deposition of 0.43 mg/cm$^2$ or more formed on the Mg alloy base material and a method of producing the article with good efficiency are provided.

15 Claims, 2 Drawing Sheets

MAGNESIUM BASED ALLOYS ARTICLE AND A METHOD THEREOF

BACKGROUND OF THE INVENTION

1. Field of the Invention

The present invention relates to a magnesium based alloys article (hereinafter also referred to as Mg alloy article) and a method of producing the Mg alloy article and more particularly, an Mg alloy article which is produced in such a manner that a Zn layer which is excellent in adhesion is applied on an Mg alloy base material and a Cu/Ni plating layer and a coating film are applied thereon and a method of producing the Mg alloy article with good efficiency.

2. Description of the Related Art

Mg alloy has been known as a metal whose specific gravity is lightest among metals in practical use and applications thereof have been studied in various fields which have an object of producing an light weight article. Speaking in a detailed manner, Mg alloy has been used in many aspects of industrial fields such as plural kinds of covers mounted on a transport vehicle, for example an automobile, home electronics products of a handy type, for example a video-camera, a personal computer of a note book type and a machine or equipment having a movable part and the usage thereof has been increasing without any pause in recent years.

In general, since Mg alloy is chemically active very much and its corrosion in an ordinary environment progresses, its surface is in advance protected with a surface treatment before use. As conventional surface treatments, there are named: an anodic treatment represented by DOW method, HAE method and the like, a chemical conversion such as chromate and in addition resin coating on these surface treatment layer.

While Mg alloy articles applied with such surface treatments are improved in anticorrosion, abrasion resistances, such as surface injury resistance, shock resistance and sliding abrasion resistance, are insufficient and therefore practical application of the alloy is still to be improved as a whole. Accordingly, there has been a great amount of desire for improvements on the abrasion resistances. In an aspect of designing, the alloy article has a poor appearance after an anodic treatment or a chromate treatment and besides there arises a new fault that a metallic glossiness is reduced even when the poor appearance has been improved by resin coating.

Moreover, these surface treatment methods use a lot of harmful materials such as chromic acid and the like and thereby there arises a problem that a liquid-waste treatment cost is increased.

As can be seen from the above description, the conventionally adopted anodic treatment, chromate treatment, coating method and the like are still insufficient in order that Mg alloy can have various functions such as the abrasion resistances, designing and the like in addition to anticorrosion and a variety of simple methods have been proposed for substitution therefor.

For example, in Publications of Unexamined Japanese Patent Application No. Hei 4-311575 and Examined Japanese Patent Application No. Sho 61-36596, a underlayer preparation method as a DOW method is disclosed in which after an Mg alloy base material is subjected to a zinc immersion process, a copper cyanide plating is conducted on the surface. Fundamental process steps comprise: degrease→water cleaning→acid cleaning→activation→water cleaning→a zinc immersion process→water cleaning→copper cyanide plating (the aforementioned process is an underlayer preparation treatment)→water cleaning→a desired plating treatment. Among the steps, the steps from degrease to activation are steps of cleaning and activating the surface of the Mg alloy base material and a step of zinc immersion thereafter is a step of zinc underlayer treatment by coating the activated surface of the Mg alloy base material with zinc. In such a manner, the above mentioned method is to coat the zinc underlayer with a copper plating layer to its fullness by performing copper cyanide plating after suppressing an active reaction of the surface of Mg alloy through forming a zinc underlayer. When such a series of underlayer treatment steps as this is applied, a desired plating treatment which follows can be performed in various conditions without being affected by environmental factors such as pH, temperature and the like. However, copper cyanide which is used in these methods is harmful and new costs for facilities and waste-liquid treatment occur. However, if copper plating is tried to be performed by other plating methods than copper cyanide plating in the above mentioned series of steps in a underlayer preparation method, there occurs a problem that good plating adhesion cannot be achieved.

While other than the above mentioned methods, there has been proposed a method in which after a zinc underlayer is formed by a zinc immersion process, a separate plating is applied, adhesion is different according to kinds of Mg alloy and kinds of treatment batch, and lacks stability, in addition other problems, plating defects such as plating swell, arise in a great extent and abnormalities are apt to occur in a plating portion. Moreover, even if a plated surface has a beautiful appearance immediately after plating, such a phenomenon as plating swell occurs by being heated in a baking finish in coating or the like has been observed.

As other plating methods, there has been proposed a method in which electroless Ni plating is directly performed on AZ 91 material (a nomenclature in ASTM standard). This method does not use an zinc immersion process and a copper cyanide plating process and forms a desired plating layer in one process, whereby a problem of liquid-waste treatment is eliminated and improvement on adhesion is to be achieved. However, this method has a problem that it can be applied to only a specific kind of alloy and lacks versatility of application.

SUMMARY OF THE INVENTION

The present invention has been made in light of the above problems and it is an object of the present invention to provide an Mg alloy article excellent in plating adhesion on any kinds of Mg alloy base and a method of obtaining the Mg alloy article with efficiency.

An Mg alloy article of the present invention obtained as a result of achievement of the above mentioned object is an article produced by the steps of forming a zinc layer with an average thickness of 0.60 $\mu$m or more or Zn deposition of 0.43 mg/cm$^2$ or more on an Mg alloy base material and in addition, as an option, forming a copper based plating layer and/or a nickel based plating layer thereon. In order to obtain a more excellent film characteristics, a coating film can be applied on the Zn layer, or Cu based plating layer and/or Ni based plating layer.

A method of producing an Mg alloy article of the present invention as a result of achievement of the above mentioned object has a gist that an Mg alloy base material is subjected to an electroplating after a zinc immersion process or in the immersion process and according to such methods, a desired Zn layer can be formed. Furthermore, in order to form a copper based plating layer on the Zn layer, a method in which a copper pyrophosphate bath is used to perform Cu based plating can be employed.

In the present invention, an article which is an Mg alloy base material having a Zn layer (so-called a Zn underlayer) of a predetermined quantity is hereinafter called as an Mg alloy article of the present invention and an article which is an Mg alloy base material having the Zn underlayer and a Cu based plating layer and/or a Ni based plating layer formed on the base material in that order, or the Mg alloy material with the Cu based plating layer and/or the Ni plating layer having a further coating film thereon is hereinafter called as an Mg alloy article of the present invention, both of which to be within the scope of the present invention. A Zn layer of the present invention means not only a pure Zn layer but also any Zn layer can be included in the scope of the present invention as far as the Zn layer keeps an action to be exerted by formation of the Zn layer (later described) without being conspicuously disturbed, though the Zn layer may include various kinds of indispensable impurity.

DETAILED DESCRIPTION OF THE PREFERRED EMBODIMENTS

Figure 1A:
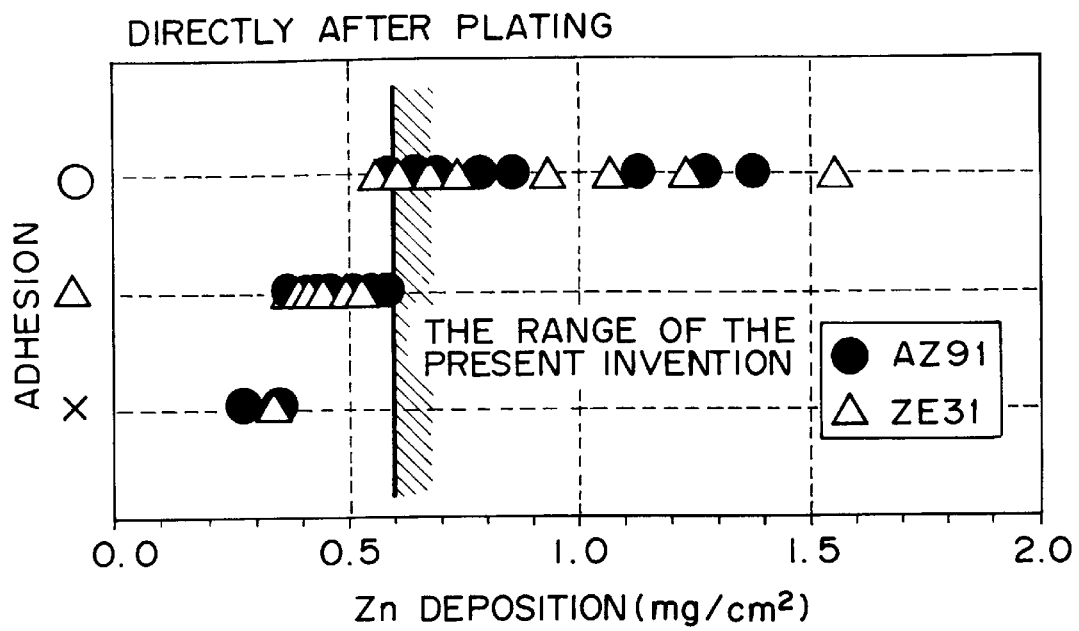
FIG. 1a is a graph showing a relation between the Zn layer thickness and the plating adhesion, in which states of a Zn plating layer after the plating is over are shown.

The present inventors has completed the present invention after conducting a serious research on a theme to provide an Mg alloy article excellent in adhesion based on findings that a clear correlation between the thickness of a Zn layer formed on an Mg alloy base material or the Zn deposition is recognized and a Zn layer having an average thickness of 0.60 $\mu$m or more, or a deposition of 0.43 mg/cm$_2$ or more is stabilized in plating adhesion to a great extent.

An Mg alloy article of the present invention is an Mg alloy article with a Zn layer of a average thickness of 0.60 $\mu$m or more, preferably of 0.65 $\mu$m or more or more preferably of 0.70 $\mu$m or more, or Zn deposition of 0.43 mg/cm$^2$ or more, preferably of 0.46 mg/cm$^2$ or more or more preferably 0.50 mg/cm$^2$ or more. A Mg alloy article with such a Zn layer is excellent in plating adhesion regardless of kinds of Mg alloy base material in use and neither of plating abnormalities such as peeling off, plating swell or the like occurs in the Zn layer. Stable plating adhesion can be obtained not only on a cast article such as AZ91 or the like but also a general forged article such as ZE 31 or the like. The reason why is considered that a Zn layer is secured to covers almost all the surface of an Mg alloy base material and defects relating to a Zn layer, which is later described, are decreased as Zn deposition or a thickness of a Zn layer is increased.

Moreover, if a thickness of a Zn layer or Zn deposition is controlled in a preferable range of the present invention, there can be achieved an advantage that more excellent adhesion can be obtained regardless of kinds of Mg alloy base material.

Furthermore, if a thickness of a Zn layer or Zn deposition is controlled in a more preferable range of the present invention, there can be available another advantage that not only is plating adhesion is further improved but a freedom in control of such as pH of a plating bath and the like is broadened and a thickness of an upper plating film can also be reduced.

If an average thickness of a Zn layer is less than 0.60 $\mu$m or Zn deposition is less than 0.43 mg/cm$^2$, a cast article such as AZ 91 or the like is subject to occurrence of adhesion abnormalities such as plating swell and a plating film is easily peeled off. Even a partly forged article ZE 31 and the like is subject to occurrence of a dotted plating swell which is considered to be caused by poor adhesion. The reason why is considered that for example, since a Zn substitution reaction is advanced with lack of uniformity because of an uneven texture caused by influence of segregation of an Mg—Al compound, a thin and coarse portion of the Zn layer is produced, which induces film defects in the next or a later step.

While there is no restriction to the upper limit of a thickness of a Zn layer, even if an average thickness is increased to several of $\mu$m or more or even if Zn deposition is increased to several of mg/cm$^2$ or more, there is no advantage available but this is economically resulted in a loss only, since productivity is reduced and an effect from formation of a Zn layer is already saturated.

It is considered that in such a manner, since a Zn layer applied in an Mg alloy article can cover all the surface of the Mg alloy base material as perfectly as perfectly can be, there is no disadvantage that a thin and coarse portion is produced in a Zn layer, as described above, and an Mg alloy article excellent in adhesion can be obtained. Therefore, various components or indispensable impurities may be mixed in a Zn layer as far as the above mentioned action is not greatly disturbed and such an Mg alloy article is included in the scope of the present invention.

As can be seen from the above description, an Mg alloy article of the present invention can be said as a novel invention in that the Mg alloy article is, in a good adhering manner, provided with a Zn layer thereon which can cover the surface of an Mg alloy base material as perfectly as perfectly can be. According to a known Zn immersion process named in the prior art, a Zn underlayer formed has at largest an average thickness in the range of 0.4 to 0.5 $\mu$m or at largest a Zn deposition in the range of 0.29 to 0.36 mg/cm$^2$ and a Zn substitution reaction is not advanced any more than that, even if a longer time of the Zn immersion process is carried out. Therefore, in the conventional zinc immersion process, it is impossible to form a Zn layer of a larger thickness than that cannot be formed and an only left way out is to adopt a different, for example, one of methods in which the base material is subjected to a hot dipped zinc coating process or is subjected to thermal spraying. However, even if a layer of several tens of $\mu$m to several mm could be obtained by such methods, a Zn layer obtained absolutely would lack functions for an underlayer for plating or a underlayer for coating as shown below.

In a method in the hot dipped zinc coating process, there is a problem that a Mg alloy article is subject to deterioration of mechanical characteristics or deformation, since a Zn—Mg alloy layer formed at an interface between a Mg alloy base material and a Zn layer is fragile or by a thermal influence in the treatment.

In a Zn thermal spraying method, since the surface of an Mg alloy base material is required to be greatly roughened (in order to obtain a large surface roughness) before a thermal spraying in order to secure adhesion of a sprayed film with the Mg alloy base material, a strong tensile stress is produced in the Zn sprayed film by a contraction stress in solidification after the thermal spraying and thereby there is a problem that the sprayed layer is subject to peeling off even if a surface roughness is sufficiently large.

As described above, in a conventional Zn immerse process, there cannot be obtained a Zn underlayer having a thickness with which plating abnormalities such as plating swell and the like can be prevented and on the other hand in the hot dipped zinc coating process, a thermal spraying method and the like, peeling off, reduction in mechanical characteristics or the like by an influence of a thermal contraction and the like is observed, even though a Zn underlayer of a predetermined thickness or a predetermined Zn deposition could be formed, so that a Mg alloy article has not been endurable for a practical operation.

An Mg alloy article of the present invention has a Mg alloy base material having a Zn layer thereon with which adhesion is excellent and plating abnormalities such as plating swell and the like can be prevented. The reason why such a Zn layer can be formed is that a zinc immersion process is applied to a Mg alloy base material in an electroplating, that is, a cathode electric process. A method of producing an Mg alloy article of the present invention is mostly characterized in that an Mg alloy base material is applied with an electroplating after a zinc immersion process or during the zinc immersion process and thereby a Zn layer of a desired thickness is obtained.

An electroplating used in the present invention may be conducted in a zinc immersion process and may be conducted after the zinc immersion process in a separate step. If either of both methods is adopted, there arise no problems of plating swell and the like and adhesion obtained can practically be sufficient. A method in which more excellent adhesion can be secured is the latter method, in which an electroplating is conducted after a zinc immersion process is over in a separate step.

In an electroplating, there is no limitation to a treatment liquid in use and a solution of a standard zinc immersion process may be used or a special treatment bath and a special solution may be used for the electroplating. As a bath composition of a Zn immersion process solution which can be used in an electroplating, there can be shown, for example, a composition of zinc sulfate 20 to 40 g/L, sodium pyrophosphate 100 to 150 g/L, sodium carbonate 3 to 7 g/L and sodium fluoride 3 to 7 g/L.

As conditions of electroplating used in the present invention, it is only required that conditions in which a predetermined amount of Zn is electrolytically deposited are properly set and, for example, a current density is in the range of 0.1 to 5 A/dm$_2$ and a temperature is set at a temperature of a ordinary Zn immersion process bath, for example in the range of 40 to 90° C.

A time period of electrolytic deposition may be set so that a Zn deposition is in the range of the present invention, for example a time period in conditions of 60° C. and a current density of 1 A/dm$_2$ may be set in the range of 1 to 2 min.

As can be seen from the above description, the most important point resides in the an electroplating is conducted during or after a Zn immersion process. In a conventional Zn immersion process, a copper cyanide plating is conducted after a Zn immersion process and in such a method, a Zn layer with a predetermined quantity cannot be obtained and besides, there have been other problems such as waste-liquid treatment and the like.

On the other hand, if an electroplating is conducted during or after a Zn immersion process as in the present invention, not only can a Zn layer of a predetermined layer be obtained, but the following advantages can be realized.

Firstly, according to the present invention, a life time of a treatment bath can be improved as compared with an ordinary Zn immersion process by a great margin. Besides, since there is no requirement for frequent replacement of the treatment bath, there can be enjoyed a secondary effects that a preparation cost of a Zn immersion process treatment solution and a cost of waste liquid treatment can be reduced.

Secondly, there is an advantage in the present invention since a method of the present invention electrolytically deposits Zn in a forcible manner by an electric action, environmental conditions in process steps, such as degrease, acid cleaning, activation, Zn substitution and the like can freely be set without any change in a bath life time according to a kind of an Mg alloy base material, whereby expanded freedom in control can be achieved and the control itself is easier.

Thirdly, while in a conventional Zn immersion process, copper plating of an underlayer using a copper cyanide plating bath has been employed, wherein speaking in a definite term, this has been only one available method, if a method of the present invention is used, it is possible to use a copper pyrophosphate bath for copper plating of the underlayer. A copper pyrophosphate bath can use a more compact facilities for waste liquid and waste gas treatments which require a lower cost as compared with the copper cyanide bath and since harmful copper pyrophosphate is not used, there can be enjoyed an advantage that a problem in the treatments of waste liquid and gas is expected to a lesser degree. Moreover, while in a plating treatment of an underlayer in which a conventional copper cyanide plating bath is used, a copper plating layer of about 25 $\mu$m has been required to be deposited in order to lower an adverse influence of pin hole formation in the plating layer, in a method of the present invention, even a copper underlayer of a thickness of 15 $\mu$m, which is almost half the thickness can sufficiently exercise a function as an underlayer, since a thickness of a Zn layer which underlies the copper underlayer is sufficient. In a conventional Zn immersion process, the reason why copper pyrophosphate have been unable to be used is considered to be that a Zn layer with so called a defective portion is produced, which exerts a wrong influence on plating adhesion. On the other hand, since in a method of the present invention, a zn layer with a predetermined quantity can be formed, formation of a Zn layer with the above mentioned defective portions is reduced and as a result, a probability of defect formation in a copper underlayer which directly follows the Zn layer formation is reduced by a great margin, whereby it is considered that a copper pyrophosphate bath can be used.

As a copper pyrophosphate bath used in the present invention, there can be named a typical bath which has conventionally been used, for example a bath having a composition of: copper pyrophosphate 70 to 100 g/L, potassium pyrophosphate 250 to 450 g/L, aqueous ammonia 2 to 6 ml/L. Plating conditions can properly be set in ordinary ranges, for example a current density 0.5 to 10 A/dm$^2$, a temperature 45 to 60° C. and pH 8,5 to 9.0. If a copper pyrophosphate strike plating is conducted before a copper pyrophosphate plating, adhesion is further improved. In the case where a glossy plating skin is desired to be obtained, a mercaptothiazole based additive as a brightener may be added by a little amount.

Since a method in which electroplating is conducted during or after a Zn immersion process, which is the most important point in a method of the present invention is a combination of a Zinc immersion process and electroplating, there may be a feeling that this method has conventionally been employed with ease. However, since it has been a strongly established recognition that a Zn immersion process is a process which is independently conducted, whereas later than the recognition, for example, another plating treatment such as a copper cyanide plating has been conducted after Zn immersion process, there has not, in the current state of the art, existed a concept that an absolutely different process such as electroplating is combined with the Zn immersion process. As a matter of fact, in order to produce an Mg alloy article, a process steps in which copper cyanide plating is conducted after a Zn immersion process has been established and in the process steps, there have been proposed improving methods in which conditions of a Zn immersion process, such as a temperature, an immersion time and the like, are changed, a composition of a copper cyanide pyrophosphate bath is changed and other changes, but a method in which an ordinary Zn immersion process is combined with electroplating has never been proposed heretofore and this is a method which has for the first time been established by the present invention. If this method is adopted, a Zn layer of a predetermined thickness or a predetermined deposition which has absolutely been unable to be achieved by a conventional method can be attained with excellent adhesion and in addition the other effects mentioned above are also obtained. Beside, since this method can be applied to various kinds of Mg alloy article and thereby applications of an Mg alloy can dramatically be spread, the present invention can be said to be a very useful invention.

While a fundamental constitution of the present invention are described as above, a neutralization treatment step can separately inserted before a Zn immersion process or a water cleaning step can be deleted as far as a behavior of Zn deposition by electroplating does not receive an adverse influence.

As mentioned above, the present invention has the most important point in that an Mg alloy base material is covered as much as possible by a Zn layer with a predetermined quantity, which has a low defect density and it is needless to say that after formation of the Zn plating layer, copper cyanide plating, electroless Ni plating and electrolytic Ni which has been conducted in a conventional Zn immerse process plating can follow in succession. After these underlayer plating steps are conducted, chrome plating, tin plating, composite/dispersion plating and the like can be applied to achieve a desired plating and thereby functions such as an abrasion resistance and design can be given or a coating treatment can be given to a Mg alloy article in process following these plating treatments. According to an application, a Zn layer is directly coated or coating can be conducted through a zinc phosphate treatment film formed on the Zn layer. Since, especially, in the case where baking finish is applied, swell and the like in a baking heat treatment can greatly be reduced by application of the present invention, a method of the present invention is very useful.

Examples will be described in order to explain the present invention in more detailed manner below. It should, however, be understood that the following examples are not intended to restrict the scope of the present invention to the description but modifications of or changes in the examples can be made as far as they fall within the scope of the present invention.

EXAMPLE 1

As an object to be treated, an AZ 91 alloy material and a ZE 31 alloy material (nomenclatures used in ASTM) were used and a relation of the thickness of a Zn layer and the Zn deposition was investigated. In a detailed manner, the object to be treated were used and after a series of steps of degrease in a bath solution→alkaline degrease→acid cleaning→activation were conducted according to an standard method, a cathode electrolytic process was conducted in a zinc immersion process bath whose composition are shown below with a current density of 1 A/dm$^2$ and a zinc immersion process time and a cathode electrolytic process time were adjusted, whereby a Zn deposition and the like were adjusted. In the example, an exchange between zinc immersion process baths was frequently conducted.

Conditions of zinc immersion treatment

* Composition of treatment bath zinc phosphate: 20 to 40 g/L sodium pyrophosphate: 100 to 150 g/L sodium carbonate: 5 g/L sodium fluoride: 5 g/L

* Treatment conditions temperature: 60±5° C.

pH: 10 to 10.5

Then copper cyanide plating was conducted according to a standard method, a Cu plating layer of 25 μm was formed and thereafter a plating layer of 15 μm was formed by conducting electro Ni—P plating in the following conditions:

Conditions of electro Ni—P plating

* Composition of treatment bath nickel sulfate: 100 to 108 g/L nickel chloride: 50 to 180 g/L phosphoric acid: 30 to 50 g/L phosphorous acid: 10 to 40 g/L boric acid: 3 g/L saccharin: 0.1 to 1g/L

* Electroplating conditions temperature: 60±5° C.

pH: 1±0.5 current density: 5 to 30 A/dm$_2$

A Zn deposition was quantified by IPC analysis, a thickness of a Zn layer was inspected at a section by SEM observation and an average thickness was calculated. Evaluation of adhesion was conducted with reference to the following criteria at timings of direct after the plating and directly after 150° C.×one hour, wherein a state of swell occurrence on a plating surface or a state of peeling-off occurrence was observed on respective samples and evaluated.

*Evaluation of plating adhesion

○:no plating swell and no peeling off

Figure 1B:
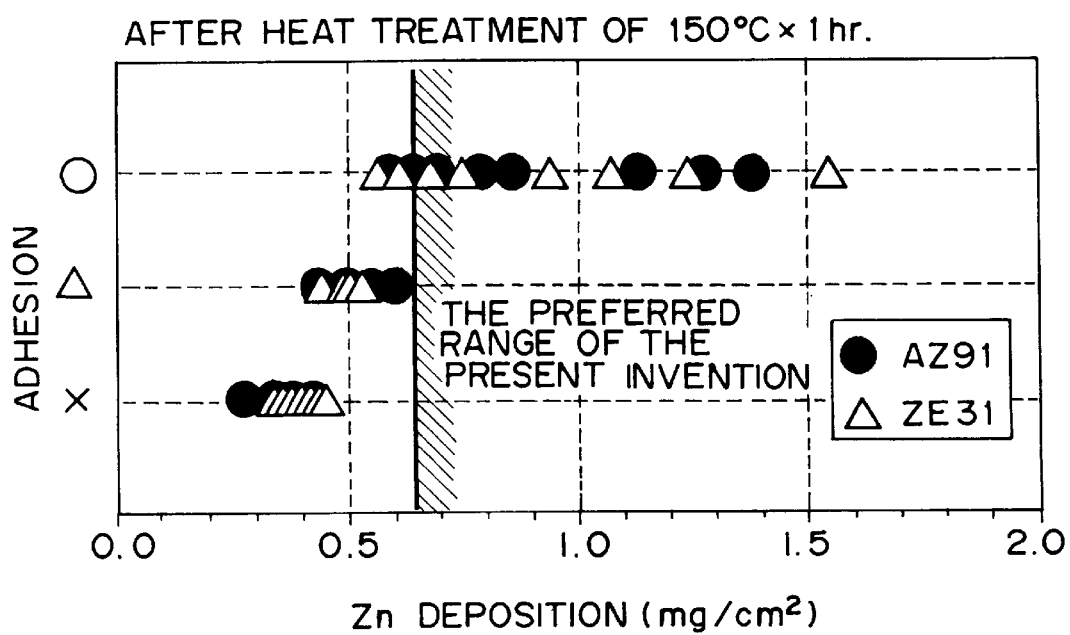
FIG. 1b is a graph showing a relation between the Zn layer thickness and the plating adhesion, in which states of a Zn plating layer directly after the plating is subjected to a heat treatment of 150° C.×one hour are shown.
Figure 2A:
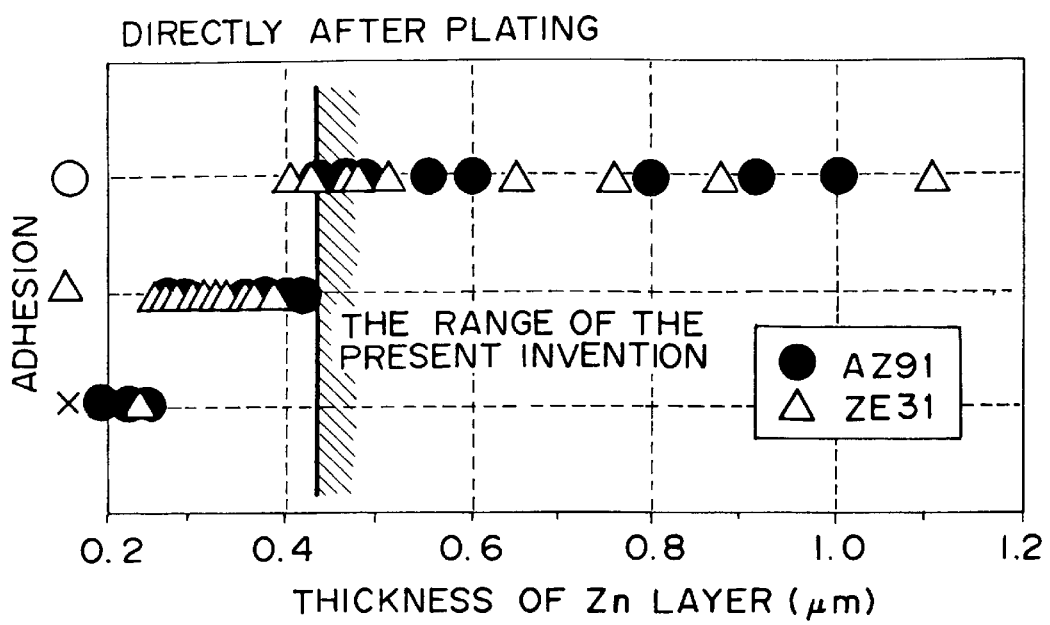
FIG. 2a is a graph showing a relation between the zinc layer and the plating adhesion, in which states of a Zn plating layer directly after the plating is over are shown.
Figure 2B:
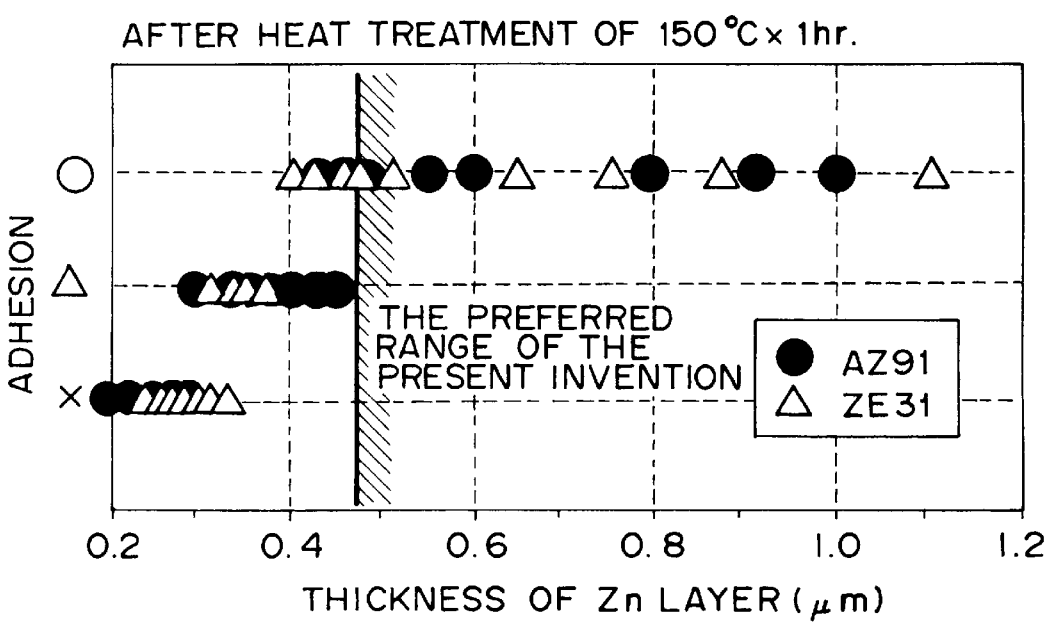
FIG. 2b is a graph showing a relation between the zinc deposition and the plating adhesion, in which states of a Zn plating layer directly after the plating is subjected to a heat treatment of 150° C.×one hour are shown.

Δ:sometimes small plating swell occurs but no peeling off x:always plating swell occurs and sometimes peeling-off occur The results are shown in FIGS. 1a, 1b and FIGS. 2a, 2b. FIGS. 1a, 1b are graphs showing relations between the Zn layer thickness and the adhesion in a Zn layer. FIG. 1a shows states after the plating and FIG. 1b shows states directly after a heat treatment of 150° C.×one hour. FIGS. 2a, 2b are graphs showing relations between the Zn depo- \* Treatment conditions temperature: 60±5° C.

pH: 10 to 10.5

The obtained results are shown in Table 1.

TABLE 1

| NO. | kinds of base material | treatment time | | Zn deposition (mg/cm²) | thickness of Zn deposition (μm) | plating adhesion | |
|---|---|---|---|---|---|---|---|
| | | Zn immersion process | electro-plating | | | directly after | after heat treatment of 150° C. × 1 hr |
| 1 | AZ91 | 300 | 0 | 0.21 | 0.28 | X | X |
| 2 | | 30 | 30 | 0.27 | 0.38 | Δ | X |
| 3 | | 60 | 60 | 0.42 | 0.59 | Δ | Δ |
| 4 | | 120 | 30 | 0.37 | 0.51 | Δ | X |
| 5 | | 15 | 90 | 0.44 | 0.62 | ○ | Δ |
| 6 | | 30 | 90 | 0.48 | 0.67 | ○ | ○ |
| 7 | | 30 | 120 | 0.54 | 0.76 | ○ | ○ |
| 8 | | 300 | 60 | 0.53 | 0.74 | ○ | ○ |
| 9 | | 300 | 120 | 0.75 | 1.05 | ○ | ○ |
| 10 | | 300 | 180 | 1.01 | 1.40 | ○ | ○ |
| 11 | ZE31 | 300 | 0 | 0.24 | 0.34 | X | X |
| 12 | | 30 | 30 | 0.28 | 0.40 | Δ | X |
| 13 | | 120 | 30 | 0.38 | 0.52 | Δ | Δ |
| 14 | | 15 | 90 | 0.47 | 0.66 | ○ | ○ |
| 15 | | 30 | 120 | 0.56 | 0.79 | ○ | ○ |
| 16 | | 60 | 60 | 0.45 | 0.61 | ○ | Δ |
| 17 | | 300 | 60 | 0.57 | 0.81 | ○ | ○ |
| 18 | | 300 | 120 | 0.70 | 0.98 | ○ | ○ |
| 19 | | 300 | 180 | 1.10 | 1.54 | ○ | ○ | sition and the adhesion thereof. FIG. 2a shows states after the plating and FIG. 2b shows states directly after a heat treatment of 150° C.×one hour.

As can clearly be seen from the figures, in the cases where thicknesses of Zn layers and depositions thereof are controlled within the range of the present invention, neither plating swell nor peeling off is observed and a good adhesion can be obtained in a stable manner. If a thickness of a Zn layer and a zinc deposition is controlled within the preferable range, a good adhesion can be secured even directly after a heat treatment. The above results were obtained on all the kinds of alloys.

On the other hand, in the cases where the fundamental conditions of the present invention are not met, plating swell and peeling off are easier to occur directly after the plating is conducted, and conspicuous plating swell and peeling off were frequently observed after the heat treatment in a greater part.

EXAMPLE 2

A zinc immersion process bath having the below described composition was used and no exchange of zinc immersion process solutions was conducted. The other conditions were the same as those of the example 1 and adhesion was evaluated in the same way as that of the example 1.

Conditions of zinc immersion treatment

\* Composition of treatment bath zinc phosphate: 35 g/L sodium pyrophosphate: 150 g/L sodium carbonate: 5 g/L sodium fluoride: 5 g/L In the table 1, Nos. 1 to 10 show results on AZ 91 alloy and Nos. 11 to 19 show results on ZE 31 alloy.

In the results, Nos. 1 and 11 were those each when a zinc immersion process was applied, but no electroplating was conducted as comparative examples. In these comparative examples, since a zinc immersion process solution was not exchanged altogether, the results were wrongly affected by deterioration of the Zn immersion process solution, so that a Zn deposition or thickness in the range defined by the present invention were not obtained and thereby adhesion was reduced. While Nos. 2 to 4 and Nos. 12, 13 are comparative examples in which thicknesses of Zn layers and Zn depositions were adjusted by controlling a zinc immersion process time and an electroplating time, since those comparative examples are not met for the defined range of the present invention, plating swell are peeling off occur directly after the plating and a degree of adhesion was further decreased directly after the heat treatment.

On the other hand, Nos. 5 to 10 and Nos. 14 to 19, which satisfied the fundamental conditions of the present invention, were excellent in adhesion directly after the plating and among them, Nos. 6 to 10, 14, 15, 17 to 19 were excellent even inadhesion directly after the heat treatment.

The examples 1 and 2 are to investigate an influence of whether or not an exchange of zinc immersion process solutions was conducted on formation of a Zn layer. From the result of the example 2, since it was found that a Zn layer was able to be formed even when no exchange of Zn immersion process solutions was conducted at all in the experiment, in the present invention, it can be understood that a lifetime of the process solution can conspicuously be extended.

EXAMPLE 3

In the following examples plating adhesion was investigated in the cases where copper pyrophosphate plating and electroless nickel plating were conducted following a Zn immersion process.

In a concrete manner, the example 3 was conducted in the same way as in the example 1 and after a zinc immersion process was applied, electroplating was conducted. In a more detailed manner, a treatment bath specialized for use in electroplating was used and specimens were treated in a bath with the same composition as that of a zinc immersion process bath at a current density of 1 A/dm². A thickness of a Zn layer and a deposition were controlled by adjusting a zinc immersion process time and a cathode electrolytic process time.

Thereafter, a copper pyrophosphate strike plating and copper pyrophosphate plating (hereinafter also simply referred to as copper pyrophosphate plating) or electroless nickel plating were conducted and thereafter elector In-P plating, which is same as in the example 1, was conducted, whereby a plating layer with a thickness of 15 μm was formed.

Conditions of copper pyrophosphate strike plating
* Composition of treatment bath
copper pyrophosphate: 10 to 20 g/L
potassium pyrophosphate: 100 to 140 g/L
potassium oxalate: 7 to 14 g/L
* Treatment conditions
current density: 1±0.5 A/dm2
temperature: 20 to 30° C.
pH: 8.5 to 9.5
Conditions of copper pyrophosphate plating
* Composition of treatment bath
copper pyrophosphate: 70 to 100 g/L
potassium pyrophosphate: 250 to 450 g/L
aqueous ammonia: 2 to 6 mg/L brightener (mercaptothiazole): trace
* Treatment conditions
current density: 0.5 to 10 A/dm²
temperature: 45 to 65° C.
pH: 8.5 to 9.5
Conditions of electroless Ni—P plating
* Composition of treatment bath
nickel sulfate: 100 to 180 g/L
nickel chloride: 50 to 180 g/L
phosphoric acid: 30 to 50 mg/L
phosphorous acid: 10 to 40 mg/L
boric acid: 3 g/L
saccharin: 0.1 to 1 g/L
* Treatment conditions
current density: 5 to 30 A/dm²
temperature: 60±5° C.
pH: 1±0.5

Evaluation of thicknesses of Zn layers and Zn depositions thus obtained and adhesions thereof were conducted in the same way as that in the example 1 and results are shown in Table 2.

TABLE 2

| No | kinds of base material | Zn deposition (mg/cm²) | thickness of Zn layer (μm) | yes or no of cathode electrolytic process | kinds & film thickness of underlayer plating | plating adhesion directly after | plating adhesion after heat treatment of 150° C. × 1 hr |
|---|---|---|---|---|---|---|---|
| 1 | AZ91 | 0.53 | 0.74 | yes | copper pyrophosphate, 15 μm | ○ | ○ |
| 2 |  | 0.53 | 0.75 | yes | copper pyrophosphate, 20 μm | ○ | ○ |
| 3 |  | 0.47 | 0.66 | yes | copper pyrophosphate, 20 μm | ○ | ○ |
| 4 |  | 0.50 | 0.70 | yes | electroless Ni, 20 μm | ○ | ○ |
| 5 | ZE31 | 0.55 | 0.77 | yes | copper pyrophosphate, 15 μm | ○ | ○ |
| 6 |  | 0.53 | 0.73 | yes | copper pyrophosphate, 20 μm | ○ | ○ |
| 7 |  | 0.48 | 0.68 | yes | copper pyrophosphate, 20 μm | ○ | ○ |
| 8 |  | 0.52 | 0.73 | yes | electroless Ni, 20 μm | ○ | ○ |

As can clearly be seen from Table 2, if a method of the present invention is adopted, copper pyrophosphate plating or electroless Ni plating, which are less harmful, and which have conventionally not been used in company with a Zn immersion process, can be used together with a Zn immersion process and an Mg alloy article which is produced in such a manner that an underlayer is deposited by either of the platings on a Mg alloy base material and electro Ni—P plating is then applied thereon is excellent in plating adhesion in either of the cases of directly after plating and directly after a heat treatment of 150° C.×1 hr.

EXAMPLE 4

In the example, adhesion was evaluated in the cases where coating was applied on various materials. In concrete manner, objects to be treated were AZ 91 alloy and ZE 31 alloy, various treatments shown in the example 3 (combinations of a Zn immersion process and electroplating, a Zn immersion process and Cu pyrophosphate plating, and a Zn immersion process and electroless nickel plating, which are those of the present invention) or the conventional Zn immersion process shown in the example 2 were conducted and thereafter a polyester based resin was applied by bar coating to a target thickness of 10 μm and treated alloy materials were subjected to baking finish at about 170° C. In the case where resin coating was directly applied on a zn immersion process film, a zinc phosphate process using a process solution which was available in the market was conducted as an underlayer treatment for coating.

Adhesion of coating films on treated steel plates obtained in such a manner was tested in a adhesion test and observation on whether or not coating films were subjected to peeled off or plating swell. In Table 3, ○ indicates that neither swell or peeling off was present and × indicates that swell or peeling were observed. Results are shown in the table.

TABLE 3

| No | kinds of base material | Zn deposition (mg/cm$^2$) | thickness of Zn layer (μm) | yes or no of cathode electrolytic process | kinds & film thickness of underlayer plating | coating adhesion ||
|---|---|---|---|---|---|---|---|
| | | | | | | coating swell | tape peeling off |
| 1 | AZ91 | 0.26 | 0.36 | no | nothing | X | X |
| 2 | | 0.94 | 1.32 | yes | nothing | ○ | ○ |
| 3 | | 0.47 | 0.66 | yes | copper pyrophosphate, 20 μm | ○ | ○ |
| 4 | | 0.50 | 0.70 | yes | electroless Ni, 20 μm | ○ | ○ |
| 5 | ZE31 | 0.24 | 0.33 | no | nothing | X | X |
| 6 | | 1.05 | 1.47 | yes | nothing | ○ | ○ |
| 7 | | 0.48 | 0.68 | yes | copper pyrophosphate, 20 μm | ○ | ○ |
| 8 | | 0.52 | 0.73 | yes | electroless Ni, 20 μm | ○ | ○ |

1: kinds of base material, 2: Zn deposition, 3: thickness of Zn layer, 4: yes or no of cathode electrolytic process, 5: kinds & film thickness of underlayer plating, 6: coating adhesion, 7: coating swell, 8: tape peeling off, 9: yes, 10: no, 11: nothing, 12: copper pyrophosphate, 13: electroless Ni In the table, Nos. 1 to 4 shows results on AZ 91 alloy serial and Nos. 5 to 8 shows results on ZE 31 alloy material. Among them, Nos. 1 and 5 are comparative examples in which only a zinc immersion process was adopted without application of electroplating and the results show that coating adhesion was lowered in both cases, since neither a Zn deposition nor a thickness of a Zn layer in the defined range of the present invention were not obtained.

On the other hand, in either of the cases where coating was applied directly on a Zn layer (Nos. 2, 6), the cases where coating is applied after copper pyrophosphate plating was applied on a Zn layer (Nos. 3, 7) and the cases where electroless plating was applied on a Zn layer (Nos. 4, 8), in which the fundamental conditions of the present invention were all satisfied, neither coating swell nor was observed. Therefore, it has been confirmed that according to the present invention, resin coating can easily be performed in a good order without any disturbance such as swell or the like.

Since the present invention is constituted as mentioned above, an Mg alloy article excellent in adhesion can be obtained regardless of kind of Mg alloy base material with good efficiency. Besides, since less harmful copper pyrophosphate plating can be adopted instead of harmful copper cyanide plating, which has conventionally been used, no problem of waste liquid treatment arises, treatment facilities can be made compact, operations are easier and an effect of extension of lifetime of a treatment bath can be realized. In light of all the advantages above mentioned, a great amount of reduction in cost and much of improvement in operational efficiency can be achieved. Furthermore, since abrasion resistance and anticorrosion are available in an Mg alloy article of the present invention, An excellent Mg alloy article which can be suitable for various applications can be produced in a stable manner.

The entire disclosure of Japanese Patent Application No. 9-97593 filed on Apr. 15, 1997 including specification, claims, drawings and summary are incorporated herein by reference in its entirety.

What is claimed is:

1. A magnesium based alloy article, comprising:
   an Mg alloy base material; and
   a Zn layer of an average thickness of 0.60 μm or more, or a Zn deposition of 0.43 mg/cm$^2$ or more formed on the Mg alloy base material.

2. The magnesium based alloy article according to claim 1, wherein an average thickness of the Zn layer is 0.65 μm or more, or the Zn deposition of 0.46 mg/cm$^2$ or more. comprising a process in which a magnesium alloy base material is subjected to electroplating after or while a Zn immersion process is applied thereto.

3. The magnesium based alloy article according to claim 1, wherein a Cu based plating layer or a Ni based plating layer, or a Cu based plating layer followed by an Ni based plating layer, is provided on the Zn layer.

4. The magnesium based alloy article according to claim 2, wherein a Cu based plating layer or a Ni based plating layer, or a Cu based plating layer followed by an Ni based plating layer, is provided on the Zn layer.

5. The magnesium based alloy article according to claim 1 or 2, wherein a coating film is provided on the Zn layer.

6. The magnesium based alloy article according to claim 3 or 4, wherein a coating film is provided on the Cu based plating layer or the Ni based plating layer, or the Cu based plating layer followed by the Ni based plating layer.

7. A method of producing a magnesium based alloy article having the Zn layer according to any one of claims 1 to 4, comprising a process in which a magnesium alloy base material is subjected to electroplating after or while zn immersion process is applied thereto.

8. The method of producing a magnesium based alloy article having the Zn layer according to claim 5, comprising a process in which a magnesium alloy base material is subjected to electroplating after or while a Zn immersion process is applied thereto.

9. The method of producing a magnesium based alloy article having the Zn layer according to claim 6, comprising a process in which a magnesium alloy base material is subjected to electroplating after or while a Zn immersion process is applied thereto.

10. The method of producing a magnesium based alloy article, comprising a process in which copper based plating according to claim 3 or 4 is conducted using a copper pyrophosphate bath after the Zn layer is formed on the magnesium alloy base material.

11. The method of producing a magnesium based alloy article, comprising a process in which copper based plating according to claim 6 is conducted using a copper pyrophosphate bath after the Zn layer is formed on the magnesium alloy base material.

12. The method of producing a magnesium based alloy article, comprising a process in which copper based plating is conducted using a copper pyrophosphate bath after the Zn layer is formed on the magnesium alloy base material by the method according to claim 7.

13. The method of producing a magnesium based alloy article, comprising a process in which copper based plating is conducted using a copper pyrophosphate bath after the Zn layer is formed on the magnesium alloy base material by the method according to claim 8.

14. The method of producing a magnesium based alloy article, comprising a process in which copper based plating is conducted using a copper pyrophosphate bath after the Zn layer is formed on the magnesium alloy base material by the method according to claim 9.

15. A magnesium based alloy article, comprising:

an Mg alloy base material; and a Zn layer of an average thickness of 0.60 $\mu$m or more, or a Zn deposition of 0.43 mg/cm$^2$ or more formed on the Mg alloy base material, obtained by a process comprising subjecting said Mg alloy base material to Zn electroplating after or while said Mg alloy base material is subjected to a Zn immersion process.

* * * * *